United States Patent Office 3,405,357
Patented Oct. 8, 1968

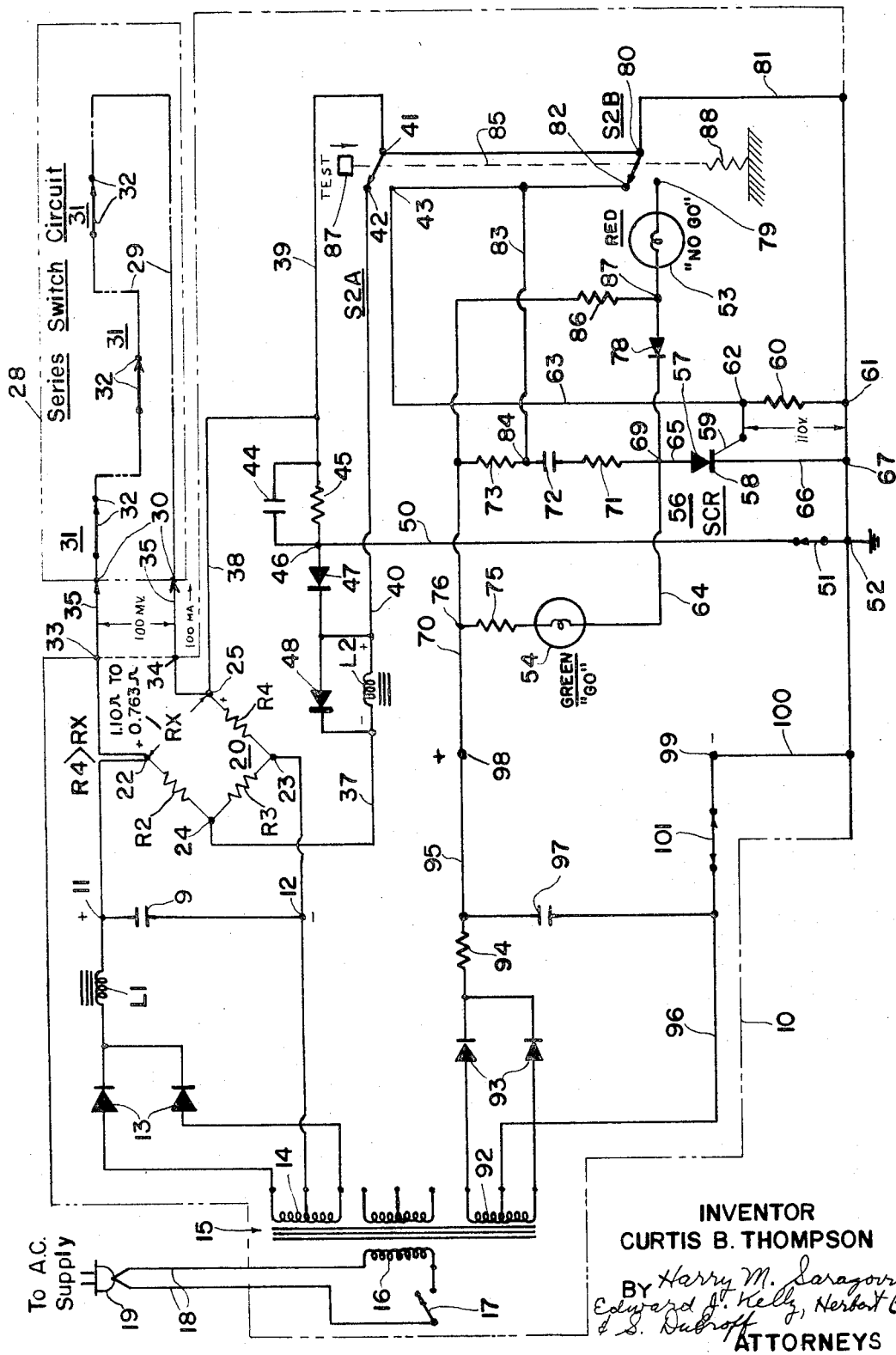

3,405,357
CONTINUITY TEST BRIDGE CIRCUIT WITH SILICON-CONTROLLED RECTIFIER INDICATOR MEANS
Curtis B. Thompson, Bellevue, Wash., assignor by mesne assignments, to the United States of America as represented by the Secretary of the Army
Filed Oct. 14, 1965, Ser. No. 496,201
5 Claims. (Cl. 324—51)

ABSTRACT OF THE DISCLOSURE

A silicon-controlled rectifier is connected in circuit with two colored indicator lamps to conduct operating current to the one and to short circuit the other, or to cut off said current and remove said short circuit to permit operating current to flow to the other, depending upon the value and polarity of the gating voltage applied to it. The gating voltage, as a pulse, is derived from a storage capacitor which is charged from an inductor connected to receive the unbalance output current from a bridge circuit one arm of which is a circuit to be tested for continuity and low resistance. If the circuit is normal the rectifier is triggered on and the one lamp is energized, but if not, low voltage or reversed polarity in the bridge output results and the rectifier remains off for each test so that the other lamp is energized to warn of the abnormal test circuit condition.

---

This invention relates to continuity testing apparatus for electrical circuits and also for determining that the circuit resistance is within prescribed limits.

Thus the present invention has for its primary object to provide an improved testing apparatus for rapidly determining that the continuity of the various circuits of an electrical apparatus are within prescribed limits.

It is a further object of this invention to provide an improved testing apparatus which allows low resistances to be checked by using a relatively low and limited test current. It is adapted for testing electrical circuits involving low resistance circuit elements, such as a series of switch contacts in the closed position to determine their effective continuity and operating condition.

It is a further and important object of this invention to provide an improved testing apparatus which provides an indication of the ability of the circuit being tested to come within prescribed limits on a simplified "no-go" basis, and thereby rapidly determining that a series of unknown resistances are within prescribed limits.

In accordance with the invention, the improved testing apparatus provides a circuit which utilizes a resistance (Wheatstone) bridge, a silicon-controlled rectifier (SCR) or the like and an energy storage circuit for controlling the firing point of the silicon-controlled rectifier. This allows lower resistance be checked while limiting the test current.

More specifically in a circuit used and described herein by way of an example, an SCR, that is, a silicon-controlled rectifier of the transistor type is used as a control element in the circuit of the test apparatus and includes a relatively simplified and effective circuit for developing the signal voltage on the SCR.

In a preferred form of the invention, a pair of signal lamps are provided for the "go"-"no-go" conditions of operation of the circuit being tested. Should one or the other of these lamps be inoperative as by being burned out or with an otherwise defective filament, a false tolerance indication would be provided by the apparatus during the successive tests.

Accordingly it is a further and important object of this invention to provide an improved resistance testing apparatus of the type referred to, wherein the indicating devices, such as signal lamps, may be tested in themselves for continuity and effective operation preceding or during any of the testing processes, and thereby assuring positive operation.

The invention will further be understood from the following description of a specific embodiment thereof, when considered with reference to the accompanying drawing, and its scope is pointed out in the appended claims.

In the drawing, the single figure is a simplified schematic circuit diagram of a test apparatus of the type referred to having an improved resistance testing circuit in which a silicon-controlled rectifier is used as the control element for indicating the resistance tolerance range by its firing point in accordance with the invention.

Referring to the drawing, a resistance testing apparatus, as outlined at 10, is provided with a circuit comprising a substantially constant DC current source indicated by the positive and negative terminals 11 and 12 respectively. In the present example, the DC source is alternating current supplied through the usual output choke coil L1 and smoothing capacitor 9 from full-wave dual rectifiers 13 in connection with the tapped secondary 14 of a power supply transformer 15. The primary winding 16 of the transformer is connected through a power switch 17 for the apparatus and current supply leads 18 with the usual current supply wall plug 19 as indicated.

A balanced resistance bridge circuit 20 is connected across the supply terminals 11 and 12 to receive a constant DC potential therefrom at its opposed input terminals 22 and 23. Thus the input terminal 22 is at a positive potential with respect to the opposite input terminal 23. In one arm of the bridge circuit is the resistor R2 and the resistor R3 in series relation with the intermediate output terminal 24 therebetween. Likewise the opposite arms of the bridge comprises the unknown resistance RX and the resistor R4 in series relation with an intermediate output terminal 25 therebetween. Current thus flows through both arms of the bridge from the positive terminal 22 to the negative terminal 23 limited by the resistance of the resistors R2, R3 and R4 in connection with the unknown resistance represented by the resistor RX, and the actual resistance of which is that of the series circuit to be tested. In the present example this is indicated in apparatus outlined at 28 as the series circuit 29 between test terminals 30 and further including series low resistance elements such as the closed switches 31. These may be located at various points in the apparatus but in the series circuit relation as indicated, whereby their series resistances are added to the circuit.

The total resistance of the circuit therefore, appearing at the terminals 30, is applied at RX in the test apparatus when two test leads 35 are connected with the terminals 30 to transfer this resistance back to the terminals 22 and 25 of the bridge through test output terminals 33 and 34 of the apparatus and the respective internal connections therewith to the terminals 22 and 25 respectively. Thus it will be seen that as the test leads 35 are applied to any test circuit, the resistance thereof will be transferred back to the bridge between the terminals 22 and 25 and will thus be in a position to be compared in the bridge with the fixed resistors therein to cause a balanced or an unbalanced voltage across the output terminals 24 and 25 of the bridge.

The output terminals 24 and 25 are connected to supply the resulting unbalance voltage which may exist between them across an inductor L2 in the test circuit and as a storage means or energy reservoir. In this circuit, the bridge terminal 24 is connected directly with the inductor L2 through an output lead 37. The opposite terminal 25 is connected through an output lead 38, a second lead 39 and a switch S2A to a lead 40 connected with the opposite terminal of the inductor L2. The switch S2A includes a selector arm or contact 41, a first contact 42 and a second contact 43, being closed to the contact 42 normally, as indicated, to provide the connection between the leads 39 and 40 and thus to connect the inductor normally across the terminals 24 and 25 as above referred to.

The lead 39 is also connected with one side of a storage capacitor 44 across which is connected a current limiting resistor 45. A common terminal 46 for the resistor 45 and the capacitor 44 is connected through a diode rectifier 47 poled in the forward direction therefrom to the lead 40. A Zener diode 48 is connected in parallel relation with the inductor L2 in this circuit. The terminal 46 is also connected through a lead 50 and a switch 51 with the chassis or system ground for the apparatus, as indicated at 52.

As part of the test apparatus, in accordance with the invention, a visual indicator means is provided by the circuit in the lower portion of the drawing. This includes as two indicator elements a pair of indicator lamps 53 and 54 and a transistor type rectifier device 56 of the SCR or signal-controlled type. This may be of the type known as a silicon-controlled rectifier as indicated. As characteristic of these devices, the rectifier is provided with an anode electrode 57, a base electrode 58, and a gate or control electrode 59. The latter is connected to a resistor 60 and through said resistor to system ground as indicated at 61. At the resistor terminal 62 the electrode 59 is further connected through a lead 63 with the terminal 43 of the switch S2A. The rectifier per se is connected serially between a lamp lead 64 and system ground 52 through an input lead 65 from the lead 64 to the anode electrode 57 and an output or base lead 66 from the base 58 to the chassis ground at the terminal 67.

The lead 64 is further connected at the terminal 69 with the supply lead 70 through a series resistor 71, a series capacitor 72, and a second series resistor 73. A circuit connection through the lamp 54 is provided from the lead 64 through a series limiting resistor 75 to the lead 70 at the terminal 76.

A circuit may likewise be traced from the terminal 69 through a diode rectifier 78 to the lamp 53 and the filament therein and thence to one terminal 79 of a test switch section S2B. The switch is provided with a movable arm or contact 80 which is connected through a lead 81 to chassis ground while for the opposite terminal 82, to which the arm is normally connected, as shown in the drawing, a lead is provided at 83 leading to the junction point 84 between the series resistor 73 and the capacitor 72. The lead 70 is connected through a series resistor 86 to a terminal 87 intermediate between the rectifier 78 and the test lamp 53 in the circuit lead 64.

The switch arm or contact 80 of the switch section S2B is connected normally to the terminal 82 as indicated and is further coupled to the switch contact or arm 41 of the switch section S2A as indicated by the dotted line 85. With this connection, the switch arm or contact 41 is connected with the terminal or contact 42 as indicated, and both movable contacts, or switch arms are operated by a test push-button or other like manual control element 87. In the present example this moves in a downward direction in test operation, as indicated by the arrowed line. The switch is maintained in its present or normal position by a return spring or like element indicated at 88 and connected with the linkage element 85 thereby normally to move both arms upwardly to the position shown and to hold them in this position.

The indicator circuit is provided with a DC voltage or power source which may be of the rectified alternating-current type as provided for the bridge circuit. In the present example, this comprises a full-wave rectifier circuit connected with the transformer secondary 92 and two diode rectifiers 93 connected to supply full-wave output current through a filter resistor 94 to output leads 95 and 96 across the output filtering capacitor 97. The leads 95 and 96 are connected respectively with positive and negative output terminals 98 and 99 as indicated. The supply lead or circuit lead 70 is connected with the terminal 98 while the ground lead or chassis 52 is connected through a lead 100 with the terminal 99, thereby making the ground negative and the supply lead 70 positive for the indicator circuit. In the particular power supply circuit shown an interlock or disconnect switch element was provided as indicated at 101.

In the test apparatus 28, the circuit to be measured consists of a series of low resistance elements of any type. The switches in the present example represent such elements and present a difficult resistance testing problem because of the relatively low resistance of the circuit with the switch contacts in perfect or acceptable operating condition. In other words, the contact resistance at 32 is relatively low and therefore the resistance applied between the test terminals 33 and 34 and appearing at the terminals 22 and 25 as RX is relatively low and substantially less than 1 ohm in most cases. In the present example it may be considered to be in the average of 1 ohm with the present limits indicated in the drawing within the confines of the bridge section as from 1.10 ohms to 0.763 ohm. Due to system limitations, the current level on the circuit represented by RX is limited to a maximum of 100 milliamps. Since the average value of RX is approximately 1 ohm, this provides a voltage of only 100 millivolts at the output terminals 33–34 and at the test circuit input terminals 30.

While the gated diode 56, which is used to provide switching action for the indicator circuit, required the relatively low voltage of about one volt to trigger it into operation, the relatively smaller voltage available on the RX circuit must still be amplified to a small degree in order to operate the gated diode, hence the additional advantage in the use of this type of diode. To do this the RX or test circuit is placed in one leg of the bridge circuit 29. The output from the bridge circuit at the terminals 24 and 25 is connected to the iron-core inductance coil or inductor L2. In the present example this may have an inductance of about .1 henry. The unbalance voltage from the bridge circuit is stored in the coil L2 until the manual or test switch S2A–S2B is moved from the normally closed position shown. Prior to such movement the unbalanced voltage flows from the terminal 25 through the leads 38 and 39, the switch contacts 41–42 and the lead 40 to the coil L2 and thence through the lead 37 to the terminal 24.

When the switch S2A is moved to open the contacts 41–42, the supply circuit to the coil L2 is broken and instead it is then traced from the lead 39 through the capacitor 44, the forward biased diode 47 to the coil L2 and thence through the lead 37 back to the terminal 24, thereby to charge the capacitor 44 to a predetermined voltage which is limited by the resistor 45. At the same time the voltage on the capacitor 44 is prevented from going above 10 volts by a Zener diode 48 which is connected in parallel with or across the inductor L2, as hereinbefore pointed out. As is understood the Zener diode back-voltage breakdown is sufficiently low to permit leakage current therethrough above a predetermined safe voltage limit.

When the switch contact 41 reaches the contact 43 to close therewith the capacitor 44, which may be considered as the control capacitor, discharges into the gate or control electrode 59 of the SCR or control rectifier 56, to trigger the indicator circuit and to permit current flow from the terminal 69 and the lead 64 through the rectifier and the lead 66 to the ground lead at terminal 67.

In the present example, the control diode or SCR may be considered to be of the type which will always conduct if a positive 3.6 volts pulse or like maximum voltage is applied thereto, but it will never conduct with less than a certain minimum positive voltage pulse such as .4 volt for example. Other voltage limits would apply to other circuits depending upon the components used.

Further, in this particular circuit the operation is such as to assure that the value of the resistance between the terminals 22 and 25 in the RX arm of the bridge never exceeds 1.10 ohms. This is a limit set in this case as a manufacturing standard or a measure of excellence beyond which the circuits of the apparatus 28 cannot be accepted for use commercially, for example. To do this, the resistance element R4 is selected so as to be slightly higher in value than the total resistance RX of the test circuit, thus assuring a positive signal pulse from the right-hand terminal 25 of the bridge. If RX should exceed the resistance of the arm R4, the signal will be negative and the SCR or controlled rectifier will never fire. As the value of RX decreases, with a better performance in the test circuit, thereby to indicate a better condition of the switch contacts, the positive pulse from the right-hand side of the bridge at the terminal 25 increases. When the value of the test circuit resistance due to a further finding of excellence, drops to the minimum level of .763 ohm, the voltage appearing at the gate of the SCR or control rectifier 56 may arise as high as 3.6 volts at each pulse. Thus for any value of RX in a test circuit less than .763 ohm, and indicating a perfectly acceptable switch contact condition throughout, a voltage greater than 3.6 volts is available to the SCR and it will always fire. If the resistance RX increases however, as the switch contact efficiency becomes less, and extends above 1.09 ohms, the voltage available to the SCR at the control terminal 59 may drop below .04 volt and the SCR will never fire. Resistance values between the limits established will thus be accepted. In this example, the above-mentioned limits were chosen.

In the bridge circuit, the terminals 22 and 23 are thus the positive and negative supply terminals respectively, and the terminals 24 and 25 are the diagonally opposite or intermediate output terminals. The resistors R2 and R3 in one branch of the bridge circuit may be equal in value while the resistance elements in the other arm or branch of the bridge at R4 and RX are of unequal value in that R4 is always made larger than RX will ever be and thus to insure that the polarity relation between the terminals 24 and 25 is that as indicated in the drawing, that is, negative at 24 and positive at 25. The output terminal 25 is thus always the positive output terminal of the bridge because of the higher voltage drawn across the larger resistor R4. In the present example it is assumed that the resistor RX will be in the range of about 1 ohm as indicated in the drawing.

However, for testing other series circuits of higher resistance it is possible that the resistor R4 may be changed to a higher value to have the same resistance relation to the resistance RX as in the present example thereby to keep the terminal 25 positive and thus to apply to the gating electrode 59 of the silicon-controlled rectifier 56 the proper firing voltage of at least 1 volt differential. Other control rectifiers of course will take different voltage values which can be provided by proper adjustment of the supply voltage at the input terminals 22 and 23 or in the relation of the resistance elements of the one arm of the bridge. In the present example the most difficult problem, that of determining the proper resistance limits for relatively low resistance circuit elements, such as switches, and utilizing minimum of current, has been taken by way of example as showing the best use for the present invention.

By this system it will be seen that the signal voltage or control voltage available to fire the silicon-controlled rectifier 56 may be derived from a suitable bridge circuit and effectively dynamically stored in the inductor circuit for use when the test button or switch is closed to apply the resulting voltage to be compared to the SCR and thus operate the indicator elements provided for showing the acceptance or rejection of the circuit or switching circuit on the test as coming within or without prescribed low resistance limits.

In the present example the annunciator or indicator circuit includes the green "GO" lamp 54 and the red "NO GO" lamp 53. If the controlled rectifier 56 is gated when the test switch button 87 is pressed to provide a test of the circuit and closure of the switch contacts 41–43 and 80–79, a current path is provided for activating the green lamp and the red lamp is short circuited through the rectifiers 78 and 56. This will be seen by tracing the effective current paths from the supply source at the terminals 98 and 99. When the control rectifier conducts from the anode 57 to the cathode 58, current flows from the positive supply terminal 98 through the lead 70 to the terminal 76, and through the limiting resistor 75 to the lamp 54 and therefrom through the lead 64 to the terminal 69. Current flows through the lead 65, the (SCR) rectifier 56, and the lead 66 to the ground lead at 67 and then back to the negative supply terminal 99 through the lead 100. Closure of the arm 80 and the contact 79 places a short circuiting connection on the red lamp 53 through the rectifier 78 and the controlled rectifier 56 to the ground lead and back through the lead 81 to the switch arm 80. This indicates a "GO" condition of the circuit being tested in the apparatus 28.

If the controlled rectifier 56 does not receive sufficient gatnig voltage then a current path is provided through the red lamp, thus indicating a "NO GO" condition. This circuit may be traced from the positive supply terminal 98 through the lead 70 thence through the limiting resistor 86, the lamp 53, the closed switch contacts 79–80, the lead 81 back to ground and the return lead 100 to the negative terminal 99.

A compensating circuit is provdied by the resistor 73 whereby, when the switch S2B is in the position for closing the contacts 80–82, the resistor 73 is in circuit as a load across the supply circuit between the terminals 98 and 99, whereas, when the switch contact 80–79 are closed, the lamp 53 is substituted for the resistor 73 therefore equalizing the load to maintain a steady voltage on the output as is desirable. This is particularly valuable when using sensitive indicating instruments instead of lamps. However, lamps are relatively low-cost visual indicating devices and serve effectively here for the purpose.

From the foregoing description it will be seen that an improved resistance measuring apparatus and circuit has been provided in accordance with the invention involving a sensitive and relatively low-cost control circuit for firing the control rectifier in the indicating circuit and one which is responsive to and differentiates between small differences in relatively low resistance circuits while utilizing a limited test current as is desirable in the present example for passing upon the effectiveness and operating condition of switch contacts in the circuit. In apparatus which requires extreme reliability this is an important item and must be determined with accuracy otherwise ineffectual operation may result often times from defective switch contacts which may be discovered by this simplified control and testing circuit.

In other words the present invention provides an improved resistance testing circuit in a test apparatus in which a silicon-controlled rectifier, transistor or like gated rectifier device is used as a control element for limiting the resistance tolerance range by its firing point. The improved control circuit for the signal voltage applied to the silicon-controlled rectifier transistor involving the voltage comparison bridge and storage inductor in connection with the control capacitor provides usable "GO" and "NO GO" control voltages to which the silicon-controlled rectifier or the like may respond and actuate differential indicator means. The lamps are one effective and simplified form of visual means.

The differential potential supply and indicator circuit of the present example provides for the effective use of a silicon-controlled rectifier circuit on which the signal or control voltage is increased to the firing point by unique means adapted for testing the effectiveness of relatively low resistance circuits.

I claim:

1. A continuity test circuit comprising, in combination,
a resistance bridge circuit having opposed positive and negative input terminals and two parallel branches connected therebetween,
two substantially-equal resistance elements connected as series resistance arms in one branch of said bridge circuit between said input terminals with an intermediate first bridge output terminal connected therebetween,
a pair of external test circuit terminals connected with said bridge circuit at the positive input terminal and an intermediate second bridge output terminal for the other branch of the bridge circuit to receive and apply thereto the resistance of an external test circuit as one arm of the second branch of the bridge circuit,
a resistor of higher resistance value than that of said test circuit connected between said second output terminal and the negative input terminal thereof as the second series arm of the second branch of the bridge circuit, thereby to provide a negative and positive relation respectively between said first and second bridge output terminals,
a test switch having a movable contact arm normally closed to a first contact and movable to a second contact, said arm being connected with said second bridge output terminal,
a control voltage storage inductor connected between the first bridge output terminal and the first contact of said test switch,
a control voltage storage capacitor connected between the second and first bridge output terminals serially through said storage inductor,
a first diode connected serially between said capacitor and inductor and poled for forward conduction in the direction of said inductor,
a pair of current-responsive test indicator devices a first of which indicates a "GO" condition of operation and a second of which initiates a "NO-GO" condition of operation when energized,
means providing positive and negative operating current supply leads for said devices,
circuit means providing current-conducting connections from the positive supply lead to said first indicating device and from the negative supply lead to the storage capacitor series junction with the first diode,
a signal-controlled rectifier connected for conduction from said indicator device to the negative supply lead,
switch means actuated with said test switch providing a second circuit connection from the negative supply lead through the second indicating device and a series current limiting resistor to the positive supply lead, and
a second diode connected between the indicator devices and poled to conduct in the direction of the first indicator device for shorting said second indicator device upon conduction by said signal-controlled rectifier,
said signal-controlled rectifier having a control or gating electrode connected to the second contact of said test switch and being responsive for conduction to a minimum gating potential applied thereto from said storage capacitor and inductor.
whereby the "GO" device will indicate when the external test circuit is continuous as the capacitor will have stored the required charge to gate the signal-controlled rectifier and the "NO-GO" device will indicate when the external test circuit is open as the capacitor will be lacking the required voltage to gate the signal-controlled rectifier.

2. A continuity test circuit comprising, in combination,
a resistance bridge circuit having opposed positive and negative input terminals and two intermediate diagonally-opposite first and second output terminals,
a pair of external test circuit terminals connected with said bridge circuit at the positive input terminal and a second of said output terminals,
a test switch including a first section having a movable contact arm normally closed to a first contact and movable to a second contact,
a control voltage storage inductor connected between the first bridge output terminal and the first contact of said test switch section,
a control voltage storage capacitor connected between the second and first bridge output terminals serially through said storage inductor,
a first diode connected serially between said capacitor and inductor and poled for forward conduction in the direction of said inductor,
a silicon controlled rectifier having a control electrode, said electrode being connected with said second contact,
a pair of current-responsive test indicator devices a first of which indicates a "GO" condition of operation and a second of which indicates a "NO-GO" condition of operation when energized,
means providing positive and negative operating current supply leads for said devices,
means providing a circuit connection between the second output terminal of said bridge circuit and the movable contact arm of said test switch section,
thereby to provide a circuit for applying a differential output voltage of the bridge circuit to the storage inductor and to permit resultant stored energy from said inductor to be transferred to said storage capacitor in operating the test switch to move the contact arm from the first contact, and
to apply a resultant control voltage from the storage capacitor to said control electrode to gate said rectifier in moving the contact arm of said test switch section to the second contact,
means connecting said first indicator device in series with said controlled rectifier across said supply leads for operation in response to gating of said rectifier,
a second section of said test switch having a second contact arm movable with the first arm and having a fixed output contact to which the second contact arm closes in the test operation,
means providing a circuit connection from said output contact through the second indicating device to the first indicating device and the controlled rectifier,
a diode connected between said first and second indicating devices and poled forwardly in the direction of the junction with the controlled rectifier,
the movable contact arm of said second switch section being connected with the negative supply lead and said second indicating device being connected with the positive supply lead at a point between said device and the diode, and
a series limiting resistor in said last named connection, thereby to provide for activating the second indicating device upon closure of said second section of said test switch and in the absence of a sufficient firing voltage for the controlled rectifier to cause it to conduct.

3. A continuity test circuit comprising in combination,
a resistance bridge circuit having positive and negative opposed input terminals and diagonally opposite output terminals,
means for connecting an external low-resistance test circuit to provide one arm of said bridge circuit in connection with the positive input terminal and one output terminal thereof whereby a differential control voltage is produced at said output terminals as the resistance of said test circuit varies with respect to fixed resistance elements of said bridge circuit and which increases as the resistance of the test circuit decreases, a signal-controlled rectifier having anode and cathode electrodes and a control electrode, inductive storage means for the output voltage connected across said output terminals, a voltage storage capacitor connected with said last named inductive storage means and with the other output terminal, test switch means connected with said storage capacitor and with said other output terminal to disconnect said inductive storage means and to connect said storage capacitor with the control electrode of said controlled rectifier, thereby to apply the stored differential voltage from said capacitor to said electrode above a pre-determined level, a first current-responsive indicating means connected with said controlled rectifier to be activated in response to operation of said test switch and firing of said rectifier by said differential voltage, and a second current-responsive indicating device connected in circuit with said controlled rectifier to be actuated in response to operation of said test switch and non-firing of said controlled rectifier.

4. A continuity test circuit comprising, in combination, a resistance bridge circuit having opposed input terminals and diagonally opposite output terminals, said bridge circuit being adapted to include an external relatively low-resistance test circuit as one arm thereof and having terminal connections therefor at one input terminal and one output terminal thereof, an energy storage inductor and a voltage-storage capacitor connected in circuit between the output terminals of said bridge circuit in series relation for receiving a differential output voltage therefrom in connection with said test circuit, a diode connected in circuit serially between said inductor and capacitor and poled for forward conduction from the capacitor to the inductor, a pair of current-responsive test indicator devices a first of which indicates a normal low resistance condition in the test circuit and a second of which indicates an abnormally high resistance condition in said test circuit when energized, means providing positive and negative operating current supply leads for said devices the negative one of which is connected with the inductor and capacitor circuit between the diode and said capacitor, a silicon-controlled rectifier connected in circuit with said indicator devices to energize the first device and short circuit the second device on firing, said rectifier having a control electrode for firing said rectifier into conduction, test switch means connected in circuit with said capacitor and inductor to apply the bridge circuit output to the inductor to store energy therein and to release said energy to charge said capacitor upon test operation and apply the charge to the control electrode of said silicon-controlled rectifier to fire it into conduction and operation of the first indicator device at output control voltages above said level, and means providing circuit connections with the second indicator device and the current supply leads to energize said device in response to control voltage below said firing level.

5. A continuity test circuit as defined in claim 4, wherein the indicator devices are of the visual type and include electric lamps in different colors, and wherein the relative resistances of the bridge circuit arms provide an effective differential voltage output for storage and application to the silicon-controlled rectifier with a minimum of test current and a high degree of sensitivity to resistance values in the test circuit.

References Cited

UNITED STATES PATENTS

| | | | |
|---|---|---|---|
| 2,635,135 | 4/1953 | Lamont | 324—52 XR |
| 2,874,351 | 2/1959 | Lamont | 324—57 |
| 3,238,532 | 3/1966 | Michel et al. | 340—285 XR |
| 3,354,358 | 11/1967 | Bray et al. | 317—148.5 |

RUDOLPH V. ROLINEC, *Primary Examiner.*

EDWARD E. KUBASIEWICZ, *Assistant Examiner.*